Sept. 8, 1964 D. W. COGSWELL 3,147,553
MOUNTINGS FOR DIRECTIONALLY SELECTIVE RAY DETECTING DEVICES
Filed March 5, 1958 3 Sheets-Sheet 1

INVENTOR.
DAVID W. COGSWELL
BY
Chapin & Neal
Attorneys

Sept. 8, 1964      D. W. COGSWELL      3,147,553
MOUNTINGS FOR DIRECTIONALLY SELECTIVE RAY DETECTING DEVICES
Filed March 5, 1958      3 Sheets-Sheet 3

INVENTOR
DAVID W. COGSWELL
BY Chapin + Neal
ATTORNEYS

United States Patent Office 3,147,553
Patented Sept. 8, 1964

3,147,553
MOUNTINGS FOR DIRECTIONALLY SELECTIVE RAY DETECTING DEVICES
David W. Cogswell, 24 Wilder Terrace, West Springfield, Mass.
Filed Mar. 5, 1958, Ser. No. 719,341
23 Claims. (Cl. 33—46)

The present invention relates to improvements in mountings for directionally selective ray detecting devices such as telescopes and in certain aspects is directed to improvements which are uniquely adapted for telescope mountings.

Devices of the present type necessarily must be mounted for rotation about two angularly disposed axes in order that they may be aimed or scan a wide spherical area.

The overall object of the present invention is to provide a mounting having improved means for swinging a directionally selective ray detecting device about a pair of angularly disposed axes.

Another object of the invention is to provide a mounting for these purposes which is extremely light in weight, compact, stable and capable of being manufactured at a low cost.

A further object of the invention is to accomplish the above ends and additionally provide improved means for locking the device in any given position.

A still further object of the invention is to provide an improved telescope mounting which incorporate the above ends and further is uniquely arranged for viewing stars and other heavenly bodies.

In one aspect the invention is characterized by a mounting wherein means are provided for mounting a directionally selective ray detecting device about a first axis and other means are provided for mounting the first means for rotation about a second axis angularly disposed to the first axis. The device is secured to its mounting endwise relative to its directional characteristic and with said characteristic angularly disposed to said first axis.

Another aspect of the invention is found in providing locking means which extend longitudinally of the above described second axis for locking engagement with the means mounting the device for rotation about the first axis so that the locking means may at all times be accessible at the same location.

A further aspect of the invention is found in a mounting of the type described wherein the means for rotatably mounting such a device about a first axis straddle and overlap the means for mounting it for rotation about a second angularly disposed axis.

The above and other related objects and features of the invention including certain novel relationships of the supporting elements to the center of gravity of the moving elements will be apparent from a reading of the following description of the disclosure found in the accompanying drawings and the novelty thereof, pointed out in the appended claims.

In the drawings:

FIG. 3A is a fragmentary section showing a modified arrangement of certain parts seen in FIG. 3;

Figure 1:
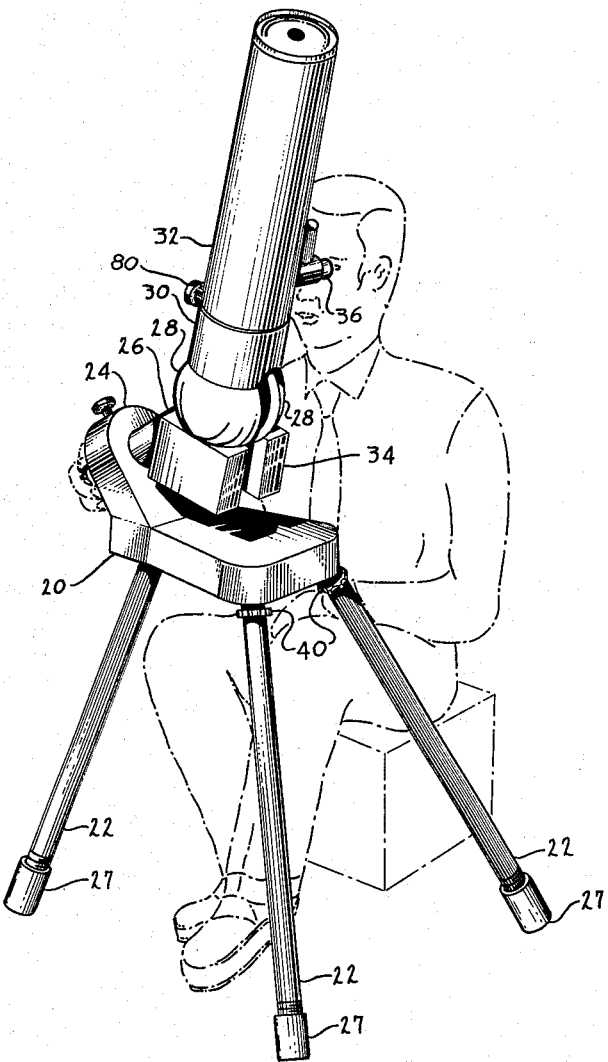
FIG. 1 is a perspective view of a telescope mounting embodying the present invention and showing the operative relationship of one type of optic system therewith.

Referring to FIG. 1, the compactness of the present mounting will first be noticed. This mounting comprises a base 20 carried on three removable legs 22. An angularly disposed housing 24 is secured to one end of the base 20 and from which extends a hollow polar support 26 formed about an axis which is to be disposed in a plane parallel to the axis of the earth's rotation and aimed toward the North Pole. The lower end of the rear central leg 22 may be made extensible by means of a nut 27 threaded thereon in order to accurately adjust the polar axis for a given latitude. Nuts 27 may be provided on the other legs 22 to assist in accurately leveling the mounting. A pair of semi-spherical shells 28 straddle the polar support 26 with a tube mounting cell 30 being detachably secured thereto. As herein illustrated, the cell 30 carries a tube 32 which is proportioned in the fashion of the Maksutov-Cassegrain type of telescope optic system. However, it is to be understood that the invention is not limited to any particular type of telescope nor to any particular type of directionally selective ray detecting device insofar as certain aspects of the invention are concerned.

The shells 28 are rotatable about the axis of the polar support and also about an axis normal thereto by reason of certain novel means which will be described presently. Thus the telescope tube may be aimed in any direction to focus upon an object in the sky and be maintained in the direction which it is aimed by counterweights 34 secured to the shells 28 opposite the tube 32. It will be noted that with this compact arrangement the ocular 36 of the telescope is conveniently disposed for a seated observer at all times at least with the particular Maksutov-Cassegrain type telescope illustrated.

Figure 3:
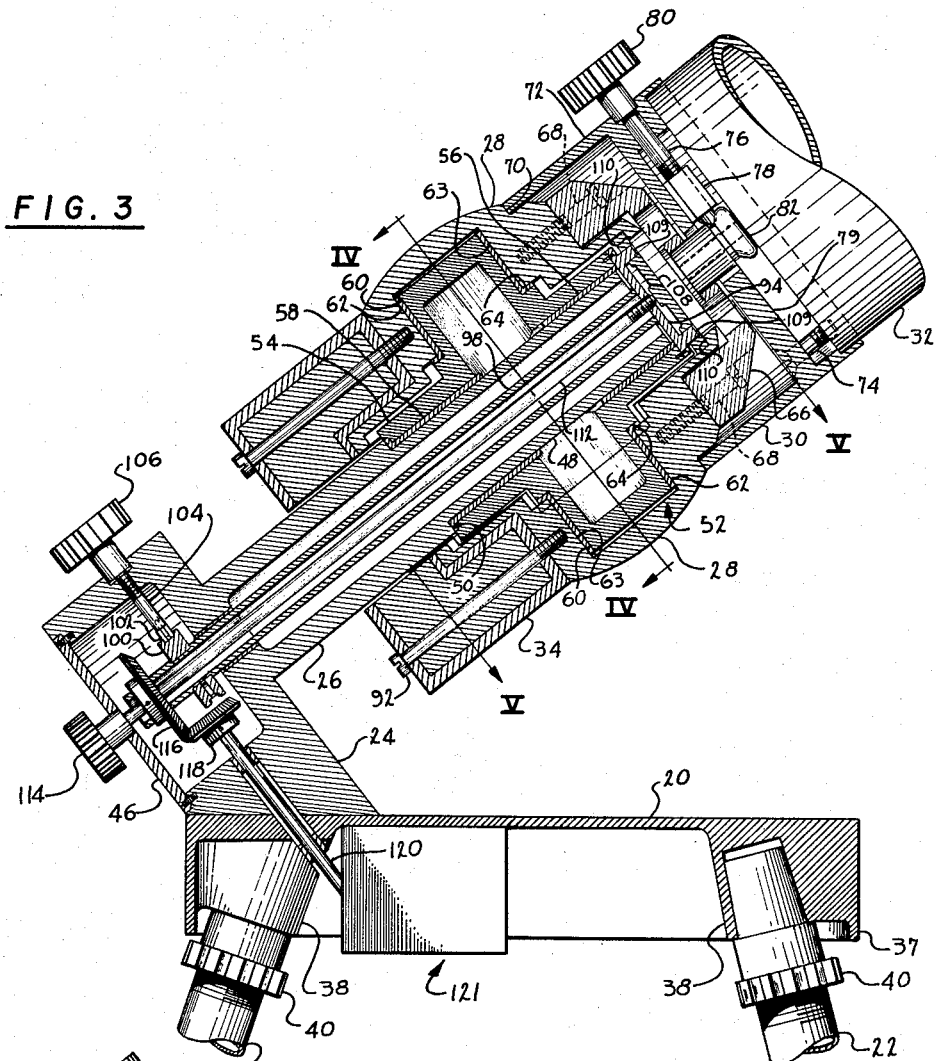
FIG. 3 is a longitudinal section of the telescope mounting seen in FIG. 1 but on an enlarged scale and with the telescope tube disposed in a different direction.

The constructional details of the present mounting will best be appreciated by next referring to FIG. 3. The base 10 has a peripheral skirt 37 and socketed bosses 38 which receive the tapered upper ends of the legs 22. A nut 40 is threaded onto each leg 22 and may be brought against the associated boss 38 to assist in removing the respective legs 22 which are firmly and rigidly held by the illustrated taper arrangement.

Figure 4:
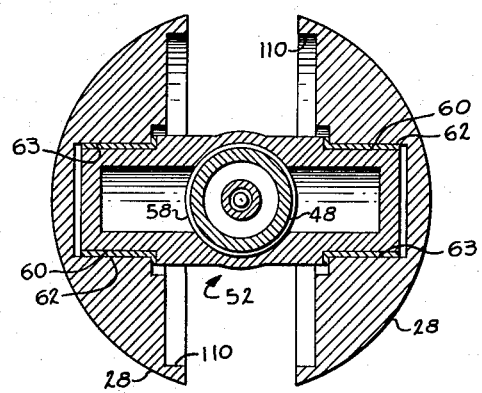
FIG. 4 is a section taken on line IV—IV in FIG. 3.
Figure 5:
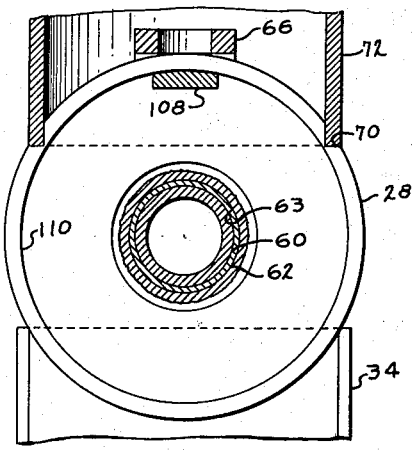
FIG. 5 is a section taken on line V—V in FIG. 3.

The housing 24 is secured by suitable means to the base 20 with its lower open end closed off by a cap 46. The outer end of the polar support 26 is formed with a reduced diameter 48, the lower end of which is defined by a shoulder 50. A trunnion 52 (see also FIGS. 4–6) comprising a tubular portion 54 is rotatably mounted on the reduced diameter 48 by way of bearing sleeves 56 and 58. The lower bearing sleeve 58 rides on the shoulder 50 to serve as a thrust bearing for the mounting relative to the polar axis. The trunnion 52 also comprises integral cross pins or pintles 60 which are formed about what is termed the declination axis of the telescope mount which axis is disposed at 90° to the polar axis and in intersecting relation thereto. The shells 28 are rotatably mounted on the cross pins 60 by way of bearing sleeves 62 to thereby form a split journal on opposite sides of the polar axis. The sleeves 62 are received by blind holes 63 in said shells. The bearing sleeves 62 are flanged to bear against shoulders 64 on the trunnion 52 to take axial as well as radial thrust relative to the declination axis.

The shells 28 are interconnected by a bridge 66 secured thereto by screws 68 to compositely form a bifurcated member. The shells 28 straddle the trunnion 52 in overlapping relation thereto and may be rotated as a unit about either the declination axis or about the polar axis or about both axes simultaneously. An annular seat 70 is compositely formed on the shells 28 to receive receptacle means in the form of a mounting cell 72 to which the telescope tube 32 is rigidly attached by screws as at 74 (FIG. 3). The cell 72 is detachably secured to the shells 28 by a screw 76 which is threaded through a lug 78 secured to an integral platform 79 intermediate the length of cell 72. The screw 76 is provided with a hand knob 80 disposed exteriorly of the cell 72 for easy manual manipulation. The inner end of screw 76 is conical and bears against an undercut stud 82 which extends through a clearance opening in the cell platform 79. The stud 82 extends through a central opening in the bridge 66 and is headed to prevent its being drawn upwardly therefrom as well as being firmly secured to the bridge by a force fit. With this arrangement the cell 72 and tube 32 may be rotated to bring the ocular 36 to a desired position on the seat 70 and locked in such position by rotating the knob 80 to force the conical end of screw 76 against stud 82 thereby firmly seating the cell 72 on the seat 70.

An alternate arrangement for mounting a modified cell 72′ on the shells 28 is seen in FIG. 3A. The cell 72′ is provided with an elongated non-binding tapered hole 84 formed in a boss centrally of the cell platform 79′ which receives a correspondingly tapered stud 86 extending from and secured to the bridge 66 in the same fashion as the stud 82. The cell 72′ is thus rotatably mounted on the shells 28 and does not rest on the seat 70 which may now be dispensed with. A screw 76′ is threaded into said central boss and also has a conical end disposed against a beveled undercut groove 88 on the stud 86. This arrangement serves the same general end as is described immediately above; however with a central bearing i.e. stud 86 having a length greater than its diameter it is possible to obtain easier rotation of the tube 32 relative to the shells 28 regardless of the direction in which the tube is aimed.

The counterweights 34 are secured by screws 92, to the shells 28 opposite the tube 32 to balance its weight. Preferably the counterweights are formed of lead with a shell of harder metal giving protection as indicated in FIG. 1. The described mounting is thus balanced about the declination axis (cross pins 60) by the counterweights 34 and since all parts are substantially symmetrically disposed, there is a weight balance about the polar axis. The tube 32 may therefore be aimed in any direction with assurance that it will stay in a given position.

Figure 6:
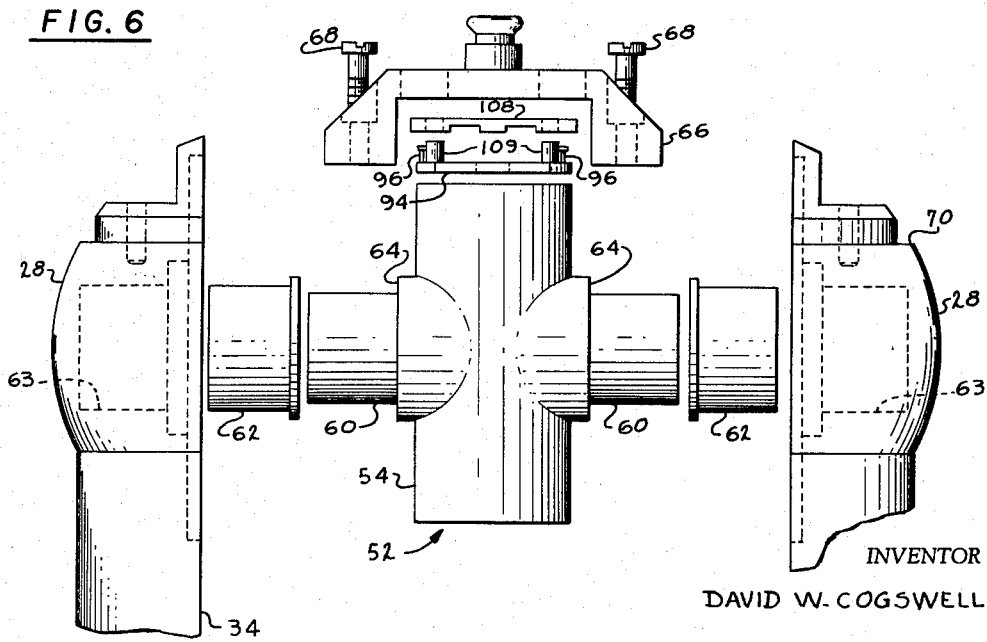
FIG. 6 is an exploded view of certain elements seen in FIG. 1.

Once the tube 32 is properly aimed it is desirable that it be locked in that position to enable an observer to study an object in the sky so that it may not be inadvertantly moved. This is preferably accomplished by providing one means for locking the tube against rotation about the polar axis and other means for locking it against rotation about the declination axis. In the present mounting this first locking action is accomplished by providing a plate 94 secured to the outer end of the trunnion 52 by screws 96 (FIGS. 3 and 6). A tube 98 is welded or brazed to the plate 94 and extends longitudinally of the polar support 26 into the housing 24. A brake drum 100 is secured to the lower end of tube 98 and arranged to be lockingly engaged by a brake shoe 102. The brake shoe 102 is carried on the inner end of a screw 104 which is threaded into the upper wall of the housing 24 and provided with a knob 106 at its outer end. It will be seen that upon tightening the brake shoe 102 against the drum 100, trunnion 52 and the telescope tube 32 cannot be rotated about the polar axis although rotation about the trunnion pintles 60 would still be possible. It will also be appreciated that the brake means shown herein can also be used as a friction drag resisting rotation.

The means for locking the telescope tube against rotation about the declination axis or pintles 60 comprise a brake shoe 108 (FIGS. 3 and 6) slidably mounted on pins 109 integral with and extending outwardly of the trunnion plate 94. Each shell 28 is provided with a brake surface 110 formed, radially of the declination axis, as an inner diameter through 360° (see FIGS. 4 and 5). A rod 112 (FIG. 3) is threaded through the plate 94 and disposed to bear against the central portion of the brake shoe 108. The rod 112 extends through and beyond the lower end of the tube 98 and is provided with a knob 114 at its lower end which is journaled in the cap 46. It will be seen that the knob 114 may be rotated to thrust the outer ends of brake shoe 108 into locking engagement with the surfaces 110 regardless of what direction the telescope tube 32 may be aimed and the relative angular relation of the shells 28 to the trunnion 52. It will also be noted that both of the locking knobs 106 and 114 are at all times located in the same relative position to the base for the convenience of the operator.

Once the telescope tube 32 is aimed at a given heavenly body, it may be desired to observe that object for a prolonged period during which the earth's rotation would carry the object out of the field of view of the telescope. For this end, means may be provided for automatically rotating the tube 32 about the polar axis to maintain a given object within the field of view of the telescope. For such purposes a bevel gear 116 is secured to the lower end of tube 98 and meshes with a bevel gear 118 secured to the upper end of a shaft 120, which shaft is journaled in the housing 24 and extends to a geared motor 121 secured to the underside of the base 20. The motor 121 and the gears 116 and 118 are arranged to rotate the tube 98 and with it the trunnion 52 and the telescope tube 32 at the rate of one revolution every 24 hours to maintain focus on a given celestial object.

The motor 121 is of conventional construction for these purposes and includes a slipping friction clutch which permits the telescope tube 32 to be manually rotated about the polar axis in aiming at a given object as above described. Once aimed, the knob 114 may be rotated to bring the brake shoe in locking engagement to prevent rotation about the declination axis. The motor 121 may then be actuated to automatically rotate the telescope tube and track the object on which it is focused.

The above described mounting is not only extremely compact, but it is more stable and rigid relative to its size than previous mountings for such directionally selective ray detecting device. Among the many features of the invention this stability is at least in part attributable to the symmetrical disposition of the movable elements about the polar axis regardless of the direction in which the tube is aimed. Further, with the counter weights 34 balancing the tube 32 in the manner illustrated, the center of gravity of the movable elements coincides with the intersection of the polar and declination axes. It will also be noted that added stability is provided to the entire mounting by reason of the fact that an extension of the center line of each leg 22 would intersect a line perpendicular to the intersection of the polar and declination axes thus distributing the weight substantially equally on each of said legs.

Other advantages are found in the above mounting by reason of the fact that the shells 28 preferably protect both the polar and declination bearings of the trunnion 52 as the pintles 60 are received in the blinded holes 63 and the shells themselves embrace the tubular portions 54 of the trunnion.

With all of this, it will be noted that there are no blind spots, i.e. the telescope tube may be freely swung to sweep the horizon or aimed at any desired azimuth. This is by reason of the fact that the trunnion 52 is capable of a full 360° swing about the polar support and the shells 28 are capable of at least a 180° swing about the trunnion pintles 60.

Figure 2:
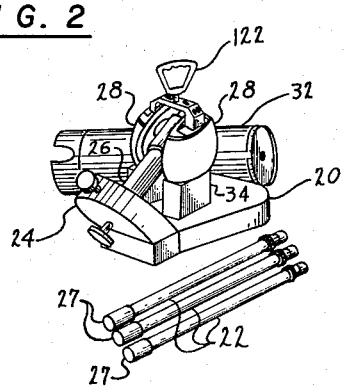
FIG. 2 is a perspective view on a smaller scale showing the elements of FIG. 1 disassembled for storage or transporting to a viewing location.

The discussion thus far has dealt with the operational advantages of the present invention, however, advantages are found in the ease with which it may be made portable and the ease with which it may be carried from place to place. The optic system, including the tube 32, may be readily removed by manipulation of the single knob 80 and the legs 22 removed from the base after the fashion seen in FIG. 2. A handle 122 may be then threaded into the stud 82. The threaded hole seen in the upper end of the stud 82 (FIG. 3) further illustrates the means for attaching handle 122. It will be noted that in carrying position, the handle 122 will be immediately over the intersection of the polar and declination axes which again are coincident with the center of gravity of the movable elements which constitute the major weight of the mounting. The declination brake may be actuated by knob 114 to prevent swing of the base 20 as the mounting is carried in one hand and the tube 32 and legs 22 carried in a bag or case in the other hand.

Having thus described my invention, what is claimed is novel and desired to be secured by Letters Patent of the United States is:

1. A mounting for a ray detecting device having a directional axis, said mounting comprising bifurcated means to which the device is secured, a trunnion embraced by said bifurcated means and having outwardly extending pintles rotatably received by said bifurcated means to provide for rotation of said bifurcated means and said device about a first axis, said trunnion having a bore disposed intermediate said pintles and said pintles being disposed intermediate the length of said bore, said bore being angularly disposed to the common axis of said pintles, and a supporting member comprising a projection rotatably received by the bore of said trunnion and extending along the length of said bore on opposite sides of said pintles to provide for rotation of said bifurcated means and said device about a second axis.

2. A mounting for a ray detecting device having a directional axis, said mounting comprising a bifurcated member to which the device is secured, a trunnion embraced by said bifurcated member and having outwardly extending pintles rotatably received by said bifurcated member to provide for rotation of said bifurcated member and said device about a first axis, said trunnion having a bore disposed intermediate said pintles and at right angles to the common axis thereof, and a supporting member comprising a tubular projection rotatably received at its outer end by the bore of said trunnion to provide for rotation of said bifurcated member and said device about a second axis, a tubular member rotatable with said trunnion and extending interiorly along said tubular projection beyond the path of movement of the movable elements of said mounting, manually operable braking means in fixed relation to said supporting member and engageable with said tubular member to prevent rotation of said trunnion, and means extending interiorly of said tubular member and engageable with said bifurcated member to brake it against rotation about said trunnion pintles, said last-named means extending beyond said supporting member for manual manipulation.

3. A mounting for a ray detecting device having a directional axis, said mounting comprising a bifurcated member to which the device is secured in an endwise sense relative to its directional axis, a trunnion embraced by said bifurcated member and having outwardly extending pintles rotatably received by said bifurcated member to provide for rotation of said bifurcated member and said device about a first axis, said trunnion having a bore disposed intermediate said pintles and at right angles to the common axis thereof, and a supporting member comprising a tubular projection rotatably received at its outer end by the bore of said trunnion to provide for rotation of said bifurcated member and said device about a second axis, a tubular member rotatable with said trunnion and extending interiorly along said tubular projection beyond the path of movement of the movable elements of said mounting, manually operable braking means in fixed relation to said supporting member and engageable with said tubular member to prevent rotation of said trunnion, and means extending interiorly of said tubular member and engageable with said bifurcated member to brake it against rotation about said trunnion pintles, said last-named means extending beyond said supporting member for manual manipulation.

4. A mounting for a ray detecting device having a directional axis, said mounting comprising bifurcated means to which the device is secured in an endwise sense relative to its directional axis, a trunnion embraced by said bifurcated means and having outwardly extending pintles rotatably received by said bifurcated means to provide for rotation of said bifurcated means and said device about a first axis, counter weights secured to said bifurcated means opposite said device to balance said device relative to said first axis, said trunnion having a bore disposed intermediate said pintles and said pintles being disposed intermediate said bore, said bore being disposed at right angles to the common axis of said pintles and a supporting member comprising a projection rotatably received by the bore of said trunnion to provide for rotation of said bifurcated means and said device about a second axis, said bifurcated means, said device and said counter weights being substantially symmetrically disposed about said second axis in all positions of the device.

5. A mounting for a ray detecting device having a directional axis, said mounting comprising bifurcated means to which the device is secured, a trunnion embraced by said bifurcated means and having outwardly extending pintles rotatably received by said bifurcated means to provide for rotation of said bifurcated means and said device about a first axis disposed at right angles to the directional axis of said device, said trunnion having a bore disposed intermediate said pintles and said pintles being disposed intermediate the length of said bore and at right angles to said first axis and a supporting member comprising a projection rotatably received by the bore of said trunnion to provide for rotation of said bifurcated means and said device about a second axis, the intersection of said first and second axes being disposed at the center of gravity of the movable elements and legs for supporting said base, said legs being disposed with their center lines each intersecting at a common point in substantial vertical alignment with the center of gravity of the movable elements.

6. A mounting for a ray detecting device having a central directional axis, said mounting comprising bifurcated means to which the device is secured in an endwise sense relative to its directional axis, a trunnion embraced by said bifurcated means and having outwardly extending pintles rotatably received by said bifurcated means to provide for rotation of said bifurcated means and said device about a first axis, said bifurcated means covering over said pintles to protect the bearing surfaces thereby provided, counter weights secured to said bifurcated means to balance said device relative to said fixed axis, said trunnion having a bore disposed intermediate said pintles and said pintles being disposed intermediate said bore, said bore being disposed at right angles to the common axis of said pintles and a supporting member comprising a projection rotatably received by the bore of said trunnion to provide for rotation of said bifurcated means and said device about a second axis, said bifurcated means, said device and said counter weights being substantially symmetrically disposed about said second axis in all positions of the device and with the intersection of said first and second axes being disposed substantially at the center of gravity of the movable elements, a tubular member rotatable with said trunnion and extending interiorly along said tubular projection beyond the path of movement of the movable elements of said mounting, manually operable braking means carried by said supporting member and engageable with said tubular member to prevent rotation of said trunnion, means extending interiorly of said tube and engageable with said bifurcated means to brake it against rotation about said trunnion pintles, said last-named means extending beyond said supporting member for manual manipulation, legs for supporting said base, said legs being disposed with their center lines each intersecting at a common point which is in substantial alignment with the center of gravity of the movable elements.

7. A telescope mounting comprising a base, a supporting member extending upwardly from said base, a hollow polar support extending from said supporting member and overlying said base, a trunnion rotatably mounted on the outer end of said polar support about a polar axis, said trunnion having a pair of aligned pintles, a bifurcated member rotatably mounted on said pintles about a declination axis normal to said polar axis, means for securing a telescope tube to said bifurcated member with the axis of said tube normal to said declination axis and means extending longitudinally and interiorly of said polar support and engageable with said bifurcated member for braking said bifurcated member against rotation about said declination axis, said longitudinally extending means being exposed adjacent said base for manual manipulation.

8. A telescope mounting comprising a base, a supporting member extending upwardly from said base, a polar support extending from said supporting member and overlying said base, a trunnion rotatably mounted on the outer end of said polar support about a polar axis, said trunnion having a pair of aligned pintles spaced intermediate the length of its rotatable mounting on the polar axis, a bifurcated member rotatably mounted on said pintles about a declination axis normal to said polar axis, said bifurcated member covering over the ends of said pintles and means for securing a telescope tube to said bifurcated member with the axis of said tube normal to said declination axis.

9. A telescope mounting comprising a base, a supporting member extending upwardly from said base, a hollow polar support extending from said supporting member and overlying said base, a trunnion rotatably mounted on the outer end of said polar support about a polar axis, said trunnion having a pair of aligned pintles, a bifurcated member rotatably mounted on said pintles about a declination axis normal to said polar axis, means for securing a telescope tube to said bifurcated member with the axis of said tube normal to said declination axis, a plate extending across the outer end of said trunnion, a brake rod threaded into said plate and extending interiorly of said polar support to and beyond said base for manual manipulation, a brake shoe slidably guided on said plate for movement toward and away from the outer end of said trunnion, said bifurcated member having on either side of said polar support a brake surface formed concentrically of said pintles whereby the brake shoe may be forced upon rotation of said brake rod into braking engagement with said surfaces in any position of the telescope.

10. A telescope mounting as in claim 9 wherein the supporting member is hollow and wherein a tube is secured to said trunnion plate and extends interiorly of said polar support into the interior of said supporting member and driving means extend into the interior of said supporting member, said driving means being arranged to rotate said tube, said trunnion and said telescope about said polar axis at the rate of one revolution in twenty-four hours to track a celestial object.

11. A telescope mounting comprising a base, a supporting member extending upwardly from said base, a hollow polar support extending from said supporting member and overlying said base, a trunnion rotatably mounted on the outer end of said polar support about a polar axis, said trunnion having a pair of aligned pintles, a bifurcated member rotatably mounted on said pintles about a declination axis normal to said polar axis, means for securing the rear end of a telescope tube to said bifurcated member with the axis of said tube normal to said declination axis, a plate extending across the outer end of said trunnion, a brake rod threaded into said plate and extending interiorly of said polar support to and beyond said base for manual manipulation, a brake shoe slidably guided on said plate for movement toward and away from the outer end of said trunnion, said bifurcated member having on either side of said polar support a brake surface formed concentrically of said pintles whereby the brake shoe may be forced upon rotation of said brake rod into braking engagement with said surfaces in any position of the telescope.

12. A telescope mounting comprising a base, a supporting member extending upwardly from said base, a hollow polar support extending from said polar member and overlying said base, a trunnion rotatably mounted on the outer end of said polar support about a polar axis, said trunnion having a pair of aligned pintles formed about an axis which intersects the polar axis substantially at the midpoint of the rotatable mounting of the trunnion on the polar support, a bifurcated member rotatably mounted on said pintles about the declination axis, means for rotatably mounting the rear end of a telescope tube on said bifurcated member with the axis of said tube normal to said declination axis and means for detachably securing said tube to said bifurcated member, a plate extending across the outer end of said trunnion, a brake rod threaded on said plate and extending interiorly and concentrically of said polar support to and beyond the base for manual manipulation, a brake shoe slidably guided on said plate for movement toward and away from the outer end of said trunnion, said bifurcated member having on either side of said polar support a brake surface formed concentrically of said pintles whereby the brake shoe may be forced upon rotation of the brake rod into braking engagement with said surface in any position of the telescope, counter weights mounted on said bifurcated member to balance the weight of the telescope about the declination axis, said counter weights, said bifurcated member and said tube being at least substantially symmetrically disposed about said polar axis, whereby the center of gravity of the movable elements is substantially co-incident with the intersection of the polar axis and the declination axis and three legs for supporting said base, said legs being disposed with their center lines intersecting a common point which is in substantially vertical alignment with the center of gravity.

13. A telescope mounting adapted to be carried by hand, said mounting comprising a base, a supporting member extending upwardly from said base, a polar member extending from said supporting member and overlying said base, a trunnion rotatably mounted on the outer end of said polar support about a polar axis, said trunnion having a pair of aligned pintles, a bifurcated member rotatably mounted on said pintles about a declination axis normal to said polar axis, said bifurcated member being adapted to receive a telescope tube and a carrying handle secured to the cross portion of the bifurcated member in substantial vertical alignment with the polar axis.

14. A telescope mounting as in claim 13, wherein the carrying handle is provided with a stud which is threaded into the bifurcated member in substantial vertical alignment with the center of gravity of the mounting.

15. A mounting for a directionally selective ray detecting device, said mounting comprising means for mounting said device for rotation of said device and said means about a first axis, means for mounting said first named means for rotation about a second axis angularly disposed to said first axis, said device being secured to said first named means with the directional characteristic thereof being disposed angularly to said first axis and braking means having an operating element lying on said second axis, said braking means being arranged to be brought into braking engagement with said first named means to selectively prevent rotation of said device about said first axis, said operating element terminating at a relatively fixed point.

16. A mounting for a ray detecting device having a directional axis, said mounting comprising bifurcated means to which said device is secured, an intermediate member embraced by said bifurcated means, means for pivotally mounting said bifurcated means for rotation on said intermediate member about an axis angularly disposed relative to said directional axis, a supporting member comprising a projection on which said intermediate member is rotatably mounted to provide for rotation of said bifurcated means and said device about a second axis angularly disposed relative to said first axis characterized in that locking means extend longitudinally of said projection and are exposed at one end of said projection for manual manipulation at a relatively fixed point and said locking means are engageable at the other end of said projection with said bifurcated means and are responsive to manual manipulation to be brought into locking engagement with said bifurcated means.

17. A mounting for a telescope of the type comprising a tube and an optical system having an eyepiece projecting laterally from the tube intermediate the length thereof, said mounting comprising an element, means for securing said tube in an endwise sense to said element, said element having a bifurcated portion projecting away from said tube, an intermediate member embraced by said bifurcated portion, means for pivotally mounting said bifurcated portion on said intermediate member for rotation about an axis angularly disposed relative to the length of said tube, a supporting member comprising a projection on which said intermediate member is rotatably mounted for rotation of said element and said tube about a second axis angularly disposed relative to said first axis, said securing means comprising a receptacle positioning the tube relative to said element with the axis of the tube lying in the same plane as said second axis.

18. A mounting for a telescope of the type comprising a tube and an optical system having an eyepiece projecting laterally from the tube intermediate the length thereof, and adjacent one end thereof, said mounting comprising an element, means for securing said tube in an endwise sense to said element, said element having a bifurcated portion projecting away from said tube, an intermediate trunnion member embraced by said bifurcated portion and having outwardly projecting pintles pivotally received by said bifurcated portion for rotation of said element and said tube about an axis normal to the axis of said tube, said axes intersecting, a supporting member comprising a projection on which said trunnion is rotatably mounted for rotation of said element in said tube about a second axis normal to said first axis and intersecting said first axis, said securing means comprising a receptacle positioning the tube relative to said element with the axis of the tube lying in the same plane as said second axis.

19. A mounting for a directionally selective ray detecting device, said mounting comprising a member to which the device is secured and having bifurcated portions projecting therefrom, an intermediate element embraced by said bifurcated portions, journal means pivotally connecting said bifurcated portions and said intermediate element for rotation of said device carrying member about a first axis, a relatively fixed member and second journal means pivotally mounting said intermediate element for rotation of said element and said device carrying member about a second axis angularly disposed relative to said first axis, characterized in that the first journal is split with portions thereof lying on opposite sides of the second journal and in that portions of the second journal, taken in a longitudinal sense, lie on opposite sides of the axis of the first journal.

20. A mounting as in claim 19 wherein said two axes intersect and the center of gravity of the structure pivoting about said first axis is located at the intersection of said axes.

21. A mounting as in claim 20 wherein the ray detecting device is in the form of a telescope comprising a tube and having an optical system wherein an eyepiece projects laterally from the tube adjacent one end thereof and further characterized in that said one end of the tube is secured to said member in an endwise sense with the bifurcated portions projecting away from the tube.

22. In a telescope mounting comprising a member pivotal about a first axis and means for rotating said member about a second axis angularly disposed to said first axis and intersecting said first axis, wherein the telescope comprises a tube and an optical system having an eyepiece projecting laterally from the tube intermediate the length of the tube; means for mounting said tube on said member in an endwise sense, said means comprising a stud projecting from said member and aligned with the intersection of said axes, means for journaling said tube for rotation about said stud and means for releasably clamping said tube to said stud, whereby the tube may be removed from said member.

23. A mounting as in claim 22 wherein the tube is rotatably mounted on the stud, the stud is grooved and the clamping means comprise a member projectible into said groove.

References Cited in the file of this patent
UNITED STATES PATENTS

| | | |
|---|---|---|
| 45,954 | Emmanuel | Jan. 17, 1865 |
| 282,117 | Randolph | July 31, 1883 |
| 333,769 | Mayer | Jan. 5, 1886 |
| 837,791 | Brunton | Dec. 4, 1906 |
| 1,186,992 | Jargstorf | June 13, 1916 |
| 2,003,171 | Burrell | May 28, 1935 |
| 2,318,910 | Zucker | May 11, 1943 |
| 2,323,473 | Korling | July 6, 1943 |
| 2,333,306 | Fishter | Nov. 2, 1943 |
| 2,459,676 | Axtell | Jan. 18, 1949 |
| 2,604,698 | Ewing | July 29, 1952 |
| 2,643,844 | Nette | June 30, 1953 |
| 2,693,032 | Braymer | Nov. 2, 1954 |
| 2,711,589 | Stock | Jan. 28, 1955 |
| 2,776,102 | Schlafly | Jan. 1, 1957 |

FOREIGN PATENTS

| | | |
|---|---|---|
| 304,252 | Italy | Dec. 31, 1932 |

OTHER REFERENCES

A pamphlet entitled New Addition to the Quick Set Tripod Line by Quick-Set Inc., 1735 Diversey Parkway, Chicago, Ill., 4 pp.; received Apr. 7, 1947.